DEFLECTION SYSTEM WITH TEMPERATURE COMPENSATED
LINEARITY CORRECTION NETWORK

Filed April 25, 1968

INVENTOR
DONALD E GRIFFEY

BY Mueller, Aichele and Rauner

ATTYS.

United States Patent Office 3,492,527

Patented Jan. 27, 1970

3,492,527

DEFLECTION SYSTEM WITH TEMPERATURE COMPENSATED LINEARITY CORRECTION NETWORK

Donald E. Griffey, Skokie, Ill., assignor to Motorola, Inc., Franklin Park, Ill., a corporation of Illinois

Filed Apr. 25, 1968, Ser. No. 724,062
Int. Cl. H01j *29/72*
U.S. Cl. 315—27 5 Claims

ABSTRACT OF THE DISCLOSURE

A sawtooth wave is predistorted by use of a positive feedback circuit to provide the correct drive signal for a television deflection yoke. The positive feedback circuit incorporates a negative temperature coefficient resistor to provide feedback compensation for temperature changes in the yoke. The negative temperature coefficient resistor is mechanically coupled to the yoke so that its temperature is substantially the same as the yoke temperature.

BACKGROUND OF THE INVENTION

Television receivers include a vertical deflection system which is synchronized with the vertical frequency of a transmitted television signal to develop and apply a sawtooth current waveform through a vertical yoke. The waveform generally comprises a slowly increasing current commonly referred to as the trace portion during which time the cathode ray beam is swept across the face of the tube for conveying the picture information, and a rapidly decreasing current commonly referred to as the retrace portion during which time the picture tube is blanked out. In order to insure accurate reproduction of the transmitted picture, it is essential that the current in the yoke during trace be linear, except for the extremities which should be flattened to compensate for the fact that the screen of the cathode ray tube is not spherical.

To counteract the non-linear characteristics of the transformer which couples the sawtooth current waveform to the yoke, such waveform must have a selected non-linear shape. In tube circuits, this may be achieved by utilizing the non-linear transfer characteristic of the vertical output tube. However, the transfer characteristic of a transistor having some degeneration is relatively linear so that if a linear sawtooth waveform is applied, a similar waveform would be developed and then distorted by the coupling transformer so as to cause nonlinear scan.

During operation of the television receiver, heat generated by the heavy current flowing through the yoke causes the temperature of the yoke to rise and change the impedance of the yoke. The change in the impedance of the yoke requires a change in the shape of the waveform applied to the yoke in order to develop a linear scan. Certain prior art circuits have attempted to solve this problem but at the cost of excessive power consumption. For example, circuits have been provided in which a temperature responsive resistor is coupled in series with the yoke to counteract the change in impedance of the yoke with temperature. However, when the stable operating temperature of the yoke is attained, the temperature compensating resistor still has appreciabble resistance so that the heavy currents required by the yoke cause a large dissipation of power in the resistor.

SUMMARY OF THE INVENTION

It is, therefore, an object of this invention to provide an improved temperature compensated deflection system for a television receiver which is capable of producing a substantially linear sawtooth current in the deflection yoke.

Another object is to provide a television receiver with a temperature compensated vertical deflection system which operates with a minimum loss in deflection power.

In a specific embodiment, the vertical deflection system according to the invention includes a transistor or set of cascaded transistors and an amplified representation of a sawtooth wave signal applied to the input electrode is derived at the output electrode and coupled through a first positive feedback circuit back to the input circuit. The first positive feedback circuit includes a series connected negative temperature coefficient resistor which is mechanically coupled to the yoke so that the negative temperature coefficient resistor is at substantially the same temperature as the yoke. As the temperature of the yoke changes the resistance of the negative temperature coefficient resistor changes to change the amount of positive feedback. The change in the feedback signal changes the pre-distortion of the output deflection signal to maintain a substantially linear sawtooth current through the yoke.

DESCRIPTION OF THE PREFERRED EMBODIMENT

Figure 1:
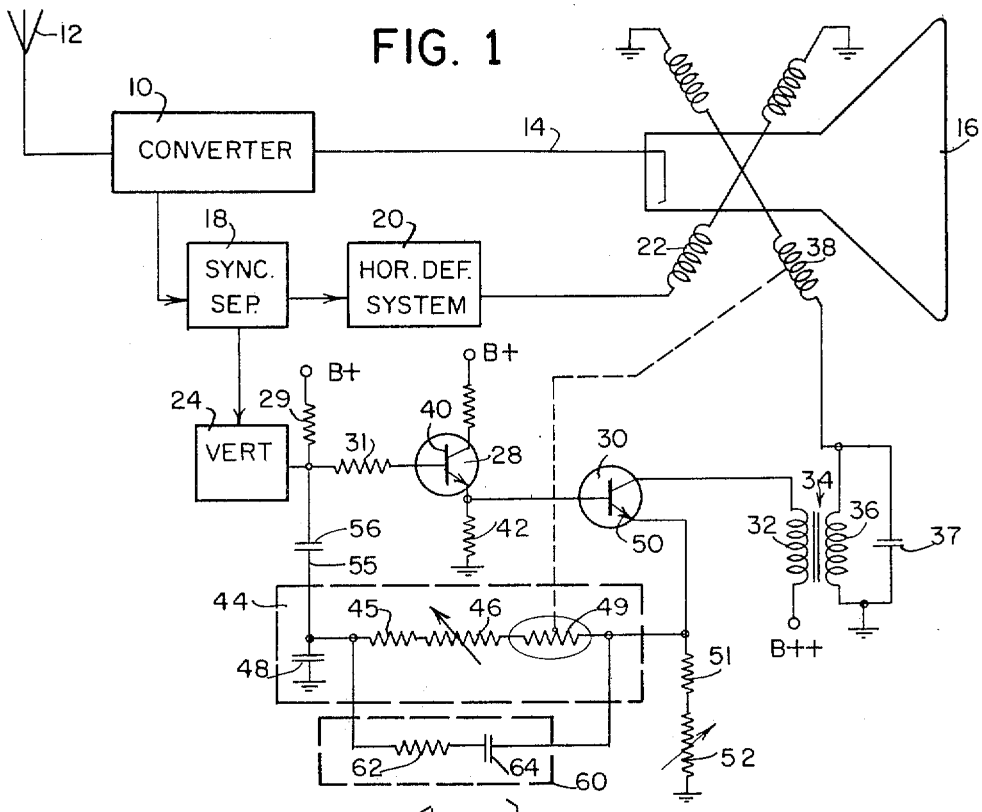
FIG. 1 illustrates a television receiver partially in block and partially in schematic incorporating the features of the invention.

Referring now to FIG. 1, the television receiver therein shown includes a converter 10 which may be of known construction for receiving radio frequency signals from antenna 12 and converting the same into video signals on conductor 14 for application to cathode ray tube 16. A synchronizing signal separator circuit 18 is coupled to converter 10 to derive horizontal synchronizing pulses for application to horizontal deflection system 20 which in turn applies a sawtooth wave current through horizontal deflection yoke 22. In addition, the horizontal deflection system includes means to provide high voltage for the final anode of cathode ray tube 16.

Synchronizing signal separator circuit 18 also provides vertical synchronizing pulses for application to vertical oscillator 24. The vertical oscillator 24 develops a synchronized vertical sawtooth waveform 26, shown in FIG. 2, which is then amplified by a driver transistor 28 and an output transistor 30. Bias for transistor 28 is provided through resistors 29 and 31 from B+. The amplified sawtooth wave signal appearing across the primary winding 32 of transformer 34 is coupled to its secondary winding 36 for application to vertical deflection yoke 38 to cause a sawtooth current to flow therethrough for vertical scan of the cathode ray beam. Capacitor 37 across the secondary 36 permits adjustment of the retrace time for current through yoke 38. In order to provide a linear transfer charactristic, and eliminate effects of transistor parameter variations, it is preferable that the transistors have some degeneration in the form of a resistor 42 connected to the emitter of transistor 28 and a load impedance consisting of resistor 51 and potentiometer 52 connected in series between the emitter 50 of transistor 30 and ground. Potentiometer 52 is variable to permit size adjustment by adjusting the peak-to-peak amplitude of the current waveform through primary winding 32. Resistor 51 insures a sufficient load resistance for developing a feedback voltage even with a minimum setting of potentiometer 52.

Figure 2:
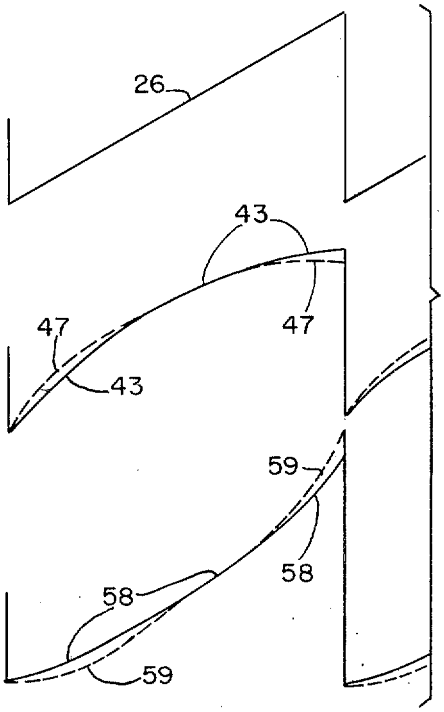
FIG. 2 illustrates waveforms useful in explaining the operation of the invention.

Since linear amplification is provided by transistors 28 and 30, if the linear sawtooth driving waveform 26 of FIG. 2 is applied to the base 40 of transistor 28 the current waveform through primary winding 32 is also represented by waveform 26. Due to the saturation characteristics of the transformer 34, the current through the yoke 38, as shown by the waveform 43 of FIG. 2, has a "flattened" terminal portion. The slope of the initial portion of waveform 43 is increased due to the energy stored in the yoke during retrace. In order to compensate for the transformer saturation and yoke energy storage, the sawtooth waveform 26 is pre-distorted before it is applied to the transformer 34. This predistortion of the waveform of the signal applied to transformer 34 is shown in waveform 58. The initial portion of the waveform 58 is flattened and the slope of the terminal portions is increased.

The pre-distortion is effected by a first feedback circuit 44 which includes a resistor 45, a potentiometer 46 and a capacitor 48, and a second positive feedback circuit 60 which includes a resistor 62 and a capacitor 64. With these positive feedback circuits the waveform of the signal applied to transformer 34 is pre-distorted to the shape shown in waveform 58.

While the waveform 58 shown in FIG. 2 can be achieved by the feedback circuits 44 and 60 with a yoke having a constant impedance, the impedance of the yoke will not remain constant during operation. The yoke of a television set draws a heavy current and this current causes the temperature of the yoke to rise to change the resistance presented by the yoke. As the temperature of the yoke increases the waveform of the current through the yoke also changes as shown by the dashed waveform portions of 47 of FIG. 2. The slope of the terminal portion of the waveform decreased and the slope of the initial portion of the waveform increases as temperature increases.

In order to provide temperature compensation to counteract the effects of the yoke heating, a negative temperature coefficient resistor 49 is coupled in series with the first feedback circuit resistors 45 and 46. While the negative temperature coefficient resistor 49 is electrically coupled in series with the first feedback circuit, it is mechanically positioned so that there is a good thermal path between the negative temperature coefficient resistor 49 and yoke 38 so that the temperature of the negative temperature coefficient resistor 49 is the same as the temperature of the yoke. In a preferred embodiment of this invention, negative temperature coefficient resistor 49 is mounted directly on the yoke.

As the temperature of the yoke increases the temperature of the negative temperature coefficient resistor 49 decreases to increase the magnitude of the positive feedback signal applied through the first positive feedback circuit 44. This increase in the positive feedback compensates for the increase in impedance of the yoke with temperature to change the waveform of the driving signal applied to transformer 34 to that shown in waveform 59. Since negative temperature coefficient resistor 49 is mounted in the feedback circuit the current flowing therethrough is relatively small so that a small inexpensive device can be used. Furthermore, the small current flowing through negative temperature coefficient resistor 49 does not cause a large dissipation of power.

I claim:

1. A deflection system for providing a sawtooth current in a cathode ray tube deflection yoke, including in combination, transistor amplifier means including input circuit means adapted to receive a sawtooth wave signal and output circuit means coupled to the deflection yoke, said transistor amplifier means acting to amplify said sawtooth wave signals and to apply the same to said yoke for use thereby, first positive feedback circuit means coupled between said output circuit means and said input circuit means for applying a portion of said amplified sawtooth wave signal thereto, said first positive feedback circuit means having temperature sensitive resistance means electrically coupled in series therewith, said temperature sensitive resistance means further being mechanically coupled to the yoke in heat transfer relationship therewith so that the temperature of said temperature sensitive resistance means varies with the temperature of said yoke, whereby the shape of said amplified sawtooth wave signal is changed to compensate for changes in the impedance of the yoke with temperature.

2. The deflection system of claim 1 wherein said temperature sensitive resistance means is a negative temperature coefficient resistor.

3. The deflection system of claim 2 wherein said first positive feedback circuit means includes first resistance means series connected with said negative temperature coefficient resistor, and said deflection system further includes second positive feedback means having third resistance means and capacitance means series connected across said first resistance means and said negative coefficient resistor.

4. A deflection system for a television receiver for providing a sawtooth current in a cathode ray tube deflection yoke, including in combination, vertical oscillator means for developing a sawtooth wave signal in response to sync signals applied thereto, transistor amplifier means including input circuit means coupled to said vertical oscillator means and output circuit means, said transistor amplifier means acting to amplify said sawtooth wave signals, transformer means coupling said output circuit means to the deflection yoke for applying said amplified sawtooth wave signals thereto, positive feedback circuit means coupled between said output circuit means and said input circuit means for applying a portion of said amplified sawtooth wave signals thereto, said positive feedback circuit means having temperature sensitive resistance means electrically coupled in series therewith, said temperature sensitive resistance means further being mechanically coupled to the yoke in heat transfer relationship therewith so that the temperature of said temperature sensitive resistance means varies with the temperature of said yoke, whereby the shape of said amplified sawtooth wave signal is changed to compensate for changes in the impedance of the yoke with temperature.

5. The deflection system of claim 4 wherein, said temperature sensitive resistance means is a negative temperature coefficient resistor.

References Cited

UNITED STATES PATENTS

| | | | |
|---|---|---|---|
| 2,932,766 | 4/1969 | Kraft | 315—27 |
| 3,292,107 | 12/1966 | Powell | 315—27 |
| 3,402,319 | 9/1968 | McDonald | 315—27 |
| 3,174,073 | 3/1965 | Massman | 315—27 |

RODNEY D. BENNETT, JR., Primary Examiner

J. G. BAXTER, Assistant Examiner